United States Patent
Cha et al.

(10) Patent No.: US 8,154,789 B2
(45) Date of Patent: Apr. 10, 2012

(54) ELECTRONIC PAPER DISPLAY DEVICE AND MANUFACTURING METHOD THEREOF

(75) Inventors: Hye Yeon Cha, Yongin-si (KR); Young Soo Oh, Seongnam-si (KR); Sang Moon Lee, Seoul (KR); Jeong Bok Kwak, Suwon-si (KR); Hwan Soo Lee, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 91 days.

(21) Appl. No.: 12/588,408

(22) Filed: Oct. 14, 2009

(65) Prior Publication Data

US 2011/0019263 A1  Jan. 27, 2011

(30) Foreign Application Priority Data

Jul. 21, 2009 (KR) .......................... 10-2009-0066228

(51) Int. Cl.
*G02B 26/00* (2006.01)
*G09G 3/34* (2006.01)

(52) U.S. Cl. ............ 359/296; 345/107; 345/84; 345/86; 264/1.36

(58) Field of Classification Search .................. 359/296; 345/60, 63, 66, 67, 71, 84, 86, 99, 106–108, 345/204, 205, 211; 445/23–25; 313/485, 313/498, 512, 582, 584–587; 106/31.16, 106/31.32; 264/1.36, 1.7
See application file for complete search history.

(56) References Cited

U.S. PATENT DOCUMENTS

| | | | | |
|---|---|---|---|---|
| 6,054,071 | A * | 4/2000 | Mikkelsen, Jr. | 264/1.36 |
| 6,239,551 | B1 * | 5/2001 | Park | 313/582 |
| 6,421,035 | B1 * | 7/2002 | Sheridon et al. | 345/85 |
| 6,456,272 | B1 * | 9/2002 | Howard et al. | 345/107 |
| 6,570,700 | B2 * | 5/2003 | Engler et al. | 359/296 |
| 6,577,432 | B2 * | 6/2003 | Engler et al. | 359/296 |
| 6,597,340 | B1 | 7/2003 | Kawai | 345/107 |
| 6,877,659 | B2 * | 4/2005 | Abramsohn | 235/454 |
| 7,057,599 | B2 * | 6/2006 | Engler et al. | 345/107 |
| 7,355,783 | B2 * | 4/2008 | Schmitz | 359/296 |
| 7,557,983 | B2 * | 7/2009 | Schmitz | 359/296 |
| 7,663,582 | B2 * | 2/2010 | Schmitz et al. | 345/84 |
| 2010/0295768 | A1 * | 11/2010 | Kwak et al. | 345/107 |

FOREIGN PATENT DOCUMENTS

| | | |
|---|---|---|
| JP | 2002-277904 | 9/2002 |
| KR | 10-0497136 | 6/2005 |
| KR | 10-0777477 | 11/2007 |
| KR | 10-2008-0024295 | 3/2008 |

OTHER PUBLICATIONS

Korean Office Action dated Nov. 29, 2011 issued in corresponding Korean Patent Application No. 10-2009-0066228.

* cited by examiner

*Primary Examiner* — Loha Ben

(57) ABSTRACT

The electronic paper display device may include a first electrode; a dielectric layer that is disposed on the first electrode and has a plurality of cells defined by a barrier; a second electrode that faces the dielectric layer; and electronic balls that are disposed in the inside of the respective cells to display an image according to the electric fields applied to the first and second electrodes wherein a side of the barrier is formed in a recessed round shape.

26 Claims, 4 Drawing Sheets

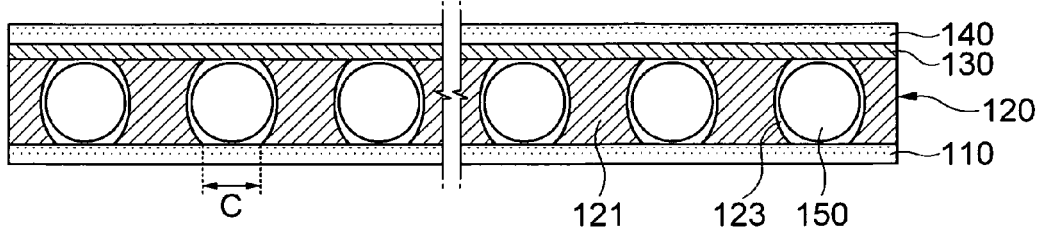
[FIG. 1]
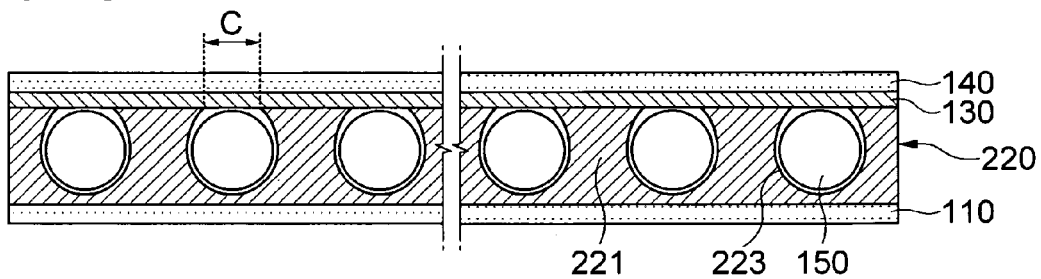
[FIG. 2]
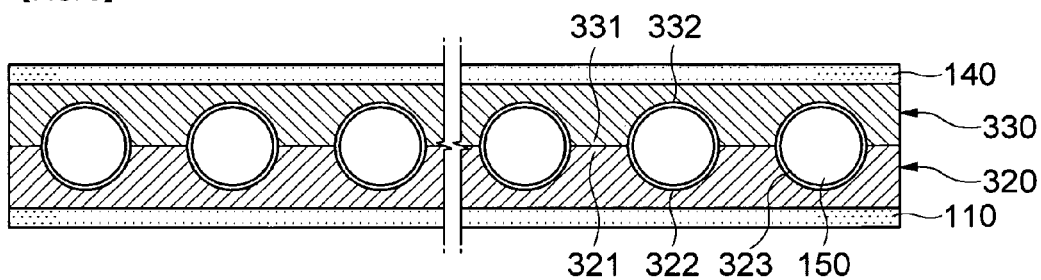
[FIG. 3]

[FIG. 4]
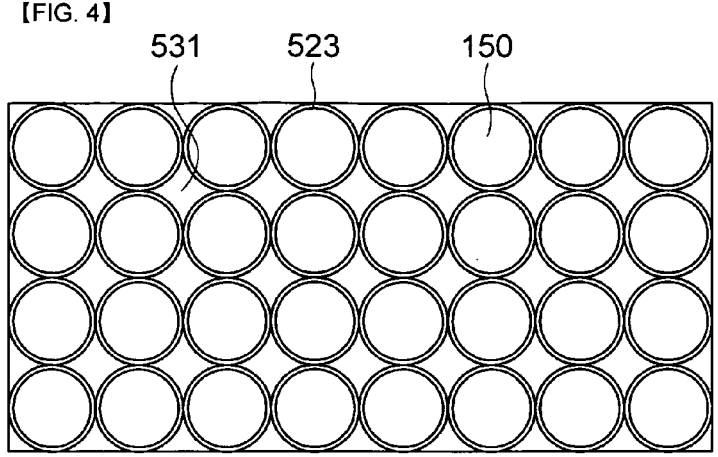
[FIG. 5]
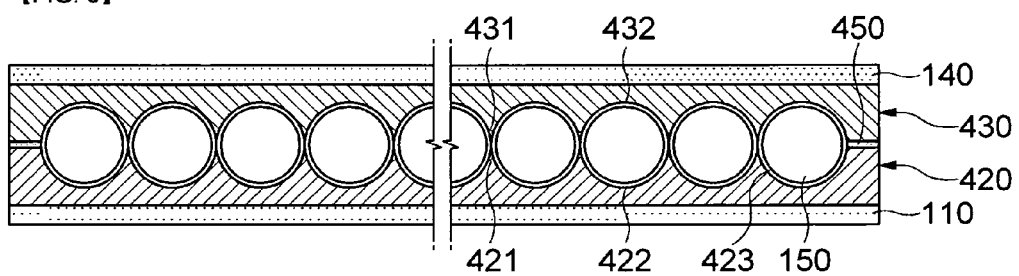
[FIG. 6]
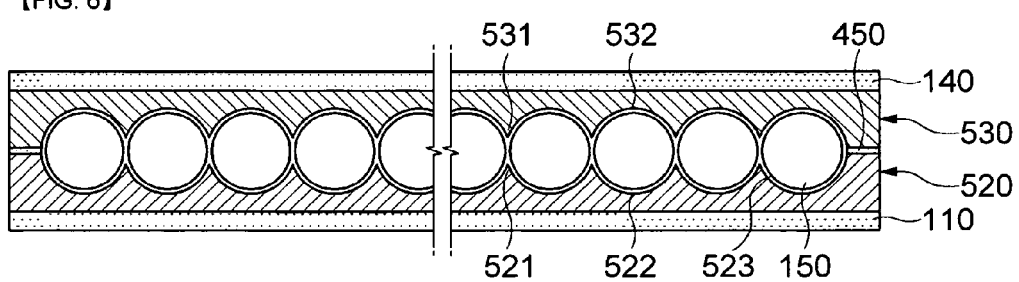

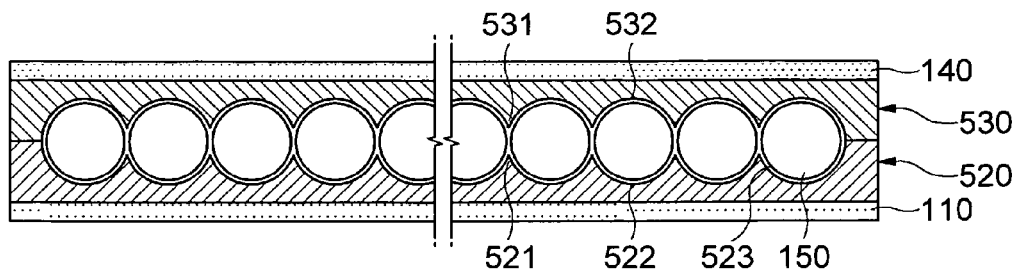
[FIG. 7]
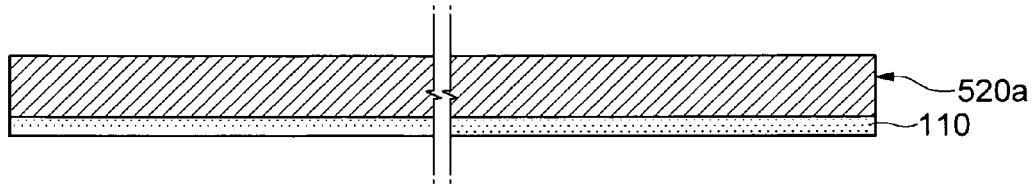
[FIG. 8]
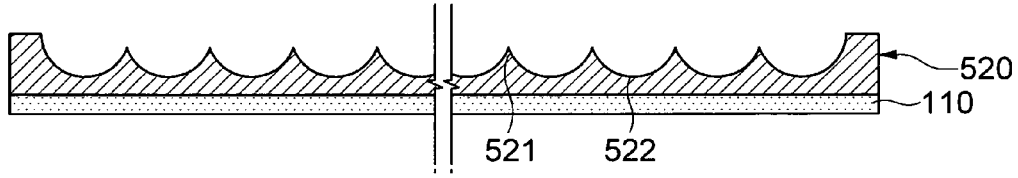
[FIG. 9]
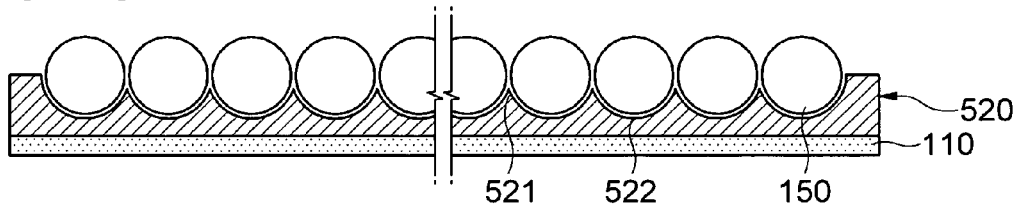
[FIG. 10]

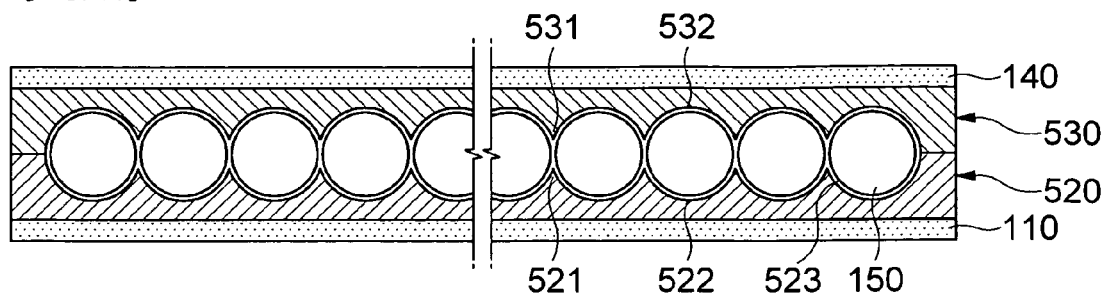
[FIG. 11]

ELECTRONIC PAPER DISPLAY DEVICE AND MANUFACTURING METHOD THEREOF

CROSS REFERENCES RELATED APPLICATIONS

The present application claims priority under 35 U.S.C. 119 and 35 U.S.C. 365 to Korean Patent Application No. 10-2009-0066228 (filed on Jul. 21, 2009), which is hereby incorporated by reference in its entirety.

BACKGROUND OF THE INVENTION

1. Field of the Invention

The present invention relates to an electronic paper display device and a manufacturing method thereof, and more particularly, to an electronic paper display device that has cells defined by a barrier and electronic balls disposed in the respective cells, and a manufacturing method thereof.

2. Description of the Related Art

As a next generation display device, a liquid crystal display (LCD), a plasma display panel (PDP), an electroluminescence, an electronic paper display device, etc. have been widely spread.

Among others, the electronic paper display device is flexibly bendable and is much cheaper than other display devices in view of its production costs.

Further, the electronic paper display device does not need a background illumination or a continuous recharging so that it can be driven with very little energy, having significantly excellent characteristics in energy efficiency.

Moreover, the electronic paper display device is clear and has a wide viewing angle, and is also able to have a memory function that displayed characters or images do not completely disappear even though power is instantly blocked. Therefore, the electronic paper display device has been expected to be widely used in a foldable screen, an electronic wallpaper, etc. as well as print media such as books, newspapers or magazines.

Meanwhile, technical schemes capable of implementing the electronic paper display device have been largely divided into a scheme using a liquid crystal, an organic EL scheme, a reflection film reflective display scheme, an electrophoretic scheme, a twist ball scheme, an electrochromic scheme, a mechanical reflective display scheme, etc. and have been developed.

Among others, the electronic paper display device using the twist balls includes two electrodes and an elastomer sheet that is interposed between the two electrodes and to which the twist balls having an optical and electrical anisotropy are attached. At this time, dielectric liquid is coated on an outer circumferential surface of the twist ball. Herein, the twist ball may be configured of a black hemisphere and a white hemisphere that are charged with different charges. With the electronic paper display device using such a twist ball, when voltage is applied to the two electrodes, the respective hemispheres of particles are rotated to face the electrode surfaces of polarities opposite to each other inside the dielectric liquid according to the applied voltage direction, thereby displaying black and white.

At this time, since the twist balls are attached onto the elastomer sheet, the twist balls are not uniformly arranged on the elastomer sheet and partial regions where the twist balls are overlapped with each other or not arranged are generated, causing a problem that the contrast ratio of the electronic paper display device is degraded.

Therefore, the electronic paper display device using the twist balls in the related art has problems that the contrast ratio is degraded or image quality defects are caused due to the degradation of the uniformity in the arrangement of the twist balls.

SUMMARY OF THE INVENTION

The present invention proposes to solve the problems that may occur in an electronic paper display device in the related art and a manufacturing method thereof. It is an object of the present invention is to provide an electronic paper display device that has cells defined by a barrier and electronic balls disposed in the respective cells, and a manufacturing method thereof.

The object of the present invention is to provide an electronic paper display device. The electronic paper display device may include a first electrode; a dielectric layer that is disposed on the first electrode and has a plurality of cells defined by a barrier; a second electrode that faces the dielectric layer; and electronic balls that are disposed in the inside of the respective cells to display an image according to the electric fields applied to the first and second electrodes wherein a side of the barrier is formed in a recessed round shape.

Herein, the electronic paper display device may further include an additional dielectric layer that faces the dielectric layer and is disposed on the second electrode.

Further, the electronic paper display device may further include an adhesive member that is interposed between the dielectric layer and the additional dielectric layer.

Moreover, the electronic balls may be twist balls or microcapsules.

In addition, the first electrode in the areas corresponding to the cells may be exposed.

Further, the first electrode in the areas corresponding to the cells may be covered by the dielectric layer.

Another object of the present invention is to provide an electronic paper display device. The electronic paper display device may include: a first electrode; a first dielectric layer that is disposed on the first electrode and has a plurality of first recessed parts, each first recessed part configured in a recessed round shape; a second dielectric layer that has a shape that is disposed on the first dielectric layer and has a plurality of second recessed parts, each second recessed part configured in a recessed round shape; a second electrode that is disposed on the second dielectric layer; and electronic balls that are disposed inside respective cells defined by the first recessed parts together with the second recessed parts and display an image according to the electric fields applied to the first and second electrodes.

Herein, the peripheral part of the first main part and the peripheral part of the second main part may contact each other.

Further, the peripheral part of the first main part and the peripheral part of the second main part may be spaced from each other.

Moreover, the electronic paper display device may further include an adhesive member that is interposed between the first dielectric layer and the second dielectric layer.

In addition, the first main part and the second main part are continuously disposed so that the top surfaces of the first and second dielectric layers may have an embossed shape, respectively.

Further, the first and second dielectric layers may be made of the same material.

Moreover, the first and second dielectric layers may be made of different materials.

In addition, the first dielectric layer may be a light reflective layer that can reflect light and the second dielectric layer may be a light transmission layer that can transmit light.

Further, the first and second dielectric layers each corresponding to the first and second recessed parts may expose the first and second electrodes.

Moreover, the first and second dielectric layers each corresponding to the first and second recessed parts may cover the first and second electrodes.

In addition, the electronic balls may be twist balls and the electronic balls may be floated on dielectric liquid filled in the respective cell areas.

Further, the electronic balls may be microcapsules.

Still another object of the present invention is to provide a manufacturing method of an electronic paper display device. The manufacturing method may include: forming a first dielectric layer having first recessed parts, each first recessed part configured in a recessed round shape on a first electrode and a second dielectric layer having second recessed parts, each second recessed part configured in a recessed round shape on a second electrode; disposing electronic balls into the first recessed parts; and disposing the second dielectric layer and the second electrode on the first dielectric layer and the electronic balls so that the electronic balls are between the first recessed part and the second recessed part.

Herein, the first and second recessed parts may be formed through an imprint method or a laser processing.

Further, in the forming the first and second dielectric layers each having the first and second recessed parts, the first and second dielectric layers may be semi-cured.

Moreover, in the bonding the first and second electrodes, the semi-cured first and second dielectric layers may be completely cured.

In addition, in the forming the first and second dielectric layers each having first and second recessed parts, the first and second dielectric layers may be completely cured.

Further, in the bonding the first and second electrodes, the first and second dielectric layers may be bonded to each other by an adhesive member interposed therebetween.

Moreover, after the bonding the first and second electrodes, the method may further include: injecting dielectric liquid into the inside of the respective cells defined by the first and second recessed parts around the electronic balls.

In addition, the first and second recessed parts are continuously formed respectively on top and bottom surfaces of the first and second dielectric layers in an embossed shape.

BRIEF DESCRIPTION OF THE DRAWINGS

FIG. 1 is a cross-sectional view of an electronic paper display device according to a first embodiment of the present invention;

FIG. 2 is a cross-sectional view of an electronic paper display device according to a second embodiment of the present invention;

FIG. 3 is a cross-sectional view of an electronic paper display device according to a third embodiment of the present invention;

FIG. 4 is a plan view of an electronic paper display device according to a fourth embodiment of the present invention;

FIG. 5 is a cross-sectional view of the electronic paper display device according to the fourth embodiment of the present invention;

FIG. 6 is a cross-sectional view of an electronic paper display device according to a fifth embodiment of the present invention;

FIG. 7 is a cross-sectional view of an electronic paper display device according to a sixth embodiment of the present invention; and FIGS. 8 to 11 are cross-sectional views explaining a manufacturing method of an electronic paper display device according to a seventh embodiment of the present invention.

DESCRIPTION FOR KEY ELEMENTS IN THE DRAWINGS

110: First electrode
120, 220: Dielectric layers
121, 221: Barriers
123, 223, 323, 423, 523: Cells
130: Additional dielectric layer
140: Second electrode
320, 420, 520: First dielectric layers
330, 430, 530: Second dielectric layers
321, 421, 521: First barriers
331, 431, 531: Second barriers
322, 422, 522: First recessed parts
332, 432, 532: Second recessed parts

DETAILED DESCRIPTION OF THE PREFERRED EMBODIMENTS

Hereinafter, exemplary embodiments of the present invention will be described in detail with reference to the accompanying drawings of an electronic paper display device. The exemplary embodiments of the present invention to be described below are provided so that those skilled in the art to which the present invention pertains can easily carry out the present invention. Therefore, the present invention may be modified in many different forms and it should not be limited to the embodiments set forth herein. In the drawings, the thickness and the size of the device may be exaggerated for the convenience. FIG. 1 is a cross-sectional view of an electronic paper display device according to a first embodiment of the present invention.

Referring to FIG. 1, the electronic paper display device according to the first embodiment of the present invention may include a first electrode 110, a dielectric layer 120, a second electrode 140, and electronic balls 150.

The first electrode 110 may be formed of a conductive substrate. Herein, the first electrode 110 may be formed of a metal substrate such as Cu and Ag by way of example. Alternately, the first electrode 110 may be formed of a conductive film. At this time, in order to support the first electrode 110, a first base layer may further be provided in the lower part of the first electrode 110. Herein, the first base layer may be formed in a substrate shape such as a plastic substrate, a glass substrate, etc., or may be formed in a film shape.

The dielectric layer 120 is disposed on the first electrode 110. The dielectric layer 120 may have a plurality of cells 123 defined by a barrier 121.

Herein, the barrier 121 may have an inwardly recessed round shape. Therefore, each cell 123 may have a recessed part shape that at least a portion thereof is round. Therefore, when electronic balls 150 to be described later are twist balls that are rotated to display an image, resistance value can be reduced in the rotational motion of the electronic balls 150. Therefore, the driving voltage applied for rotating the electronic balls 150 can be reduced, consequently making it possible to lower the driving voltage of the electronic paper display device. Herein, the first electrode 110 in the area C corresponding to the respective cells 123 may be exposed from the dielectric layer 120.

The dielectric layer 120 may be made of thermosetting resin or UV curable resin. For example, the dielectric layer 120 may be made of polyurethane acrylate (PUA) or polydimethylsiloxane (PDMS), but it is not limited thereto in the embodiment of the present invention.

The second electrode 140 may be disposed on the dielectric layer 120. Herein, when the first electrode 110 is made of conductive material that reflects light, the second electrode 140 may be made of conductive material that can transmit light, for example, ITO, IZO, ITZO, etc.

The second electrode 140 may be formed of a conductive substrate. Alternately, the second electrode 140 may also be formed of a conductive film. At this time, in order to support the second electrode 140, a second base layer may further be provided on the second electrode 140. Herein, the second base layer may be formed in a substrate shape or in a film shape. The second base layer may also be made of transparent material that can transmit light. For example, the second base layer may be made of polyethylene terephthalate (PET), polyvinyl alcohol (PVA), polyethylene (PE), polycarbonate (PC), polyacrylate, polymethylmethacrylate, polyurethane, cellulose acetate butylate (CAB), etc.

The electronic balls 150 may be disposed inside the respective cells 123 between the dielectric layer 120 and the second electrode 140. Therefore, the electronic balls 150 can be uniformly arranged by the cells 123, making it possible to improve the contrast ratio and to prevent the image quality defects from being generated. In view of the plane, the electronic balls 150 may be disposed in various shapes according to the arrangement shapes of the cells. In other words, in view of the plane, the electronic balls 150 may be disposed to have predetermined row and column or they may be uniformly and easily disposed on various spaces such as a triangular shape, a rectangular shape, a polygonal shape, a circular shape, etc.

The electronic balls 150 can display an image according to the electric fields applied to the first and second electrodes 110 and 140. For example, the electronic ball 150 may be a twist ball configured of a first hemisphere that reflects light and a second hemisphere that absorbs light. Herein, the first hemisphere and the second hemisphere may be charged with different charges. At this time, the insides of the respective cells 123 may be filled with dielectric liquid and the electronic balls 150 may be floated on the inside of the dielectric liquid. Herein, the electronic balls 150 are rotated by the electric fields applied to the inside of the respective cells 123 having the dielectric liquid as media, making it possible to display an image.

The shape of the electronic ball is not limited in the embodiment of the present invention but, by way of another example of the electronic ball 150, it may be a microcapsule having particles charged with different charges inside the capsule.

In addition, in order to prevent the contact between the electronic balls 150 and the second electrode 140, an additional dielectric layer 120 may further be provided on the lower part of the second electrode 140. Thereby, the charges charged to the electronic balls 150 can be prevented from being leaked through the second electrode 140. At this time, the additional dielectric layer 130 may have a flat surface.

The additional dielectric layer 130 may be made of the same material as the dielectric layer 120. The additional dielectric layer 130 may be made of resin that can transmit light. For example, the additional dielectric layer 130 may be made of polyurethane acrylate (PUA) or polydimethylsiloxane (PDMS).

In addition, although not shown in the drawing, the first electrode 110 and the second electrode 140 may be bonded to each other, while sealing the electronic balls 150, by an adhesive member interposed between the dielectric layer and the second electrode 140 or between the dielectric layer 120 and the additional dielectric layer 130. Herein, the adhesive member, which is resin having adhesion, may be made of UV curable resin by way of example.

However, the adhesive member is not always provided in the embodiment of the present invention. In other words, the first electrode 110 and the second electrode 140 may be bonded to each other using the adhesive force between the dielectric layer 120 and the additional dielectric layer 130.

Therefore, the electronic paper display device according to the embodiment of the present invention has cells defined by the barrier so that the electronic balls can be uniformly disposed, making it possible to prevent the contrast ratio from being degraded or to prevent the image quality defects from being generated.

Further, the barrier is formed in a round shape so that the electronic balls can be easily rotated, making it possible to lower the driving voltage of the electronic paper display device.

Moreover, the electronic balls can be arranged in various shapes according to the arrangement shapes of the cells, making it possible to improve the degree of freedom in designing the electronic paper display device.

Hereinafter, an electronic paper display device according to a second embodiment of the present invention will be described with reference to FIG. 2. Herein, the second embodiment of the present invention may have the same constitution as the aforementioned first embodiment, excepting for the shape of the dielectric shape. Therefore, the explanation of the second embodiment overlapped with the first embodiment will be omitted and the same reference numerals will be given to the same constituents.

FIG. 2 is a cross-sectional view of an electronic paper display device according to a second embodiment of the present invention.

Referring to FIG. 2, the electronic paper display device according to the second embodiment of the present invention may include a first electrode 110, a dielectric layer 220 that is disposed on the first electrode 110 and has a plurality of cells 223, a second electrode 140 that faces the dielectric layer 220, and electronic balls 150 that are disposed inside the respective cells 223 to display an image according to the electric fields applied to the first and second electrodes 110 and 140.

The electronic balls 150 may be twist balls or microcapsules by way of example. Herein, when the electronic balls 150 are twist balls, the inside of the respective cells 223 may be filled with dielectric liquid and the electronic balls 150 may be floated on the inside of the dielectric liquid.

The cells 223 provided in the dielectric layer 220 may be defined by a barrier 221 in an inwardly recessed round shape. At this time, the first electrode 110 in the area C corresponding to the cell 223 may be covered by the dielectric layer 220. Therefore, the dielectric layer 220 is interposed between the first electrode 110 and the electronic balls 150, making it possible to prevent the contact between the first electrode 110 and the electronic balls 150. Thereby, the charges charged to the electronic balls 150 can be prevented from being leaked to the first electrode 110.

The cell 223 may have a recessed part in a round shape due to the shape of the barrier 221. For example, the cell 223 may have a hemisphere shape. Therefore, when the electronic ball 150 is a twist ball, the electronic ball 150 has reduced resistance value for being rotated in the inside of the cell 223, making it possible to lower the driving voltage for rotating the electronic ball 150.

In addition, the electronic paper display device may further include an additional dielectric layer 130 that faces the dielectric layer 220 and is disposed on the lower part of the second electrode 140. The additional dielectric layer 130 may serve to prevent the contact between the second electrode 140 and the electronic balls 150.

The additional dielectric layer 130 may be made of the same material as the dielectric layer 220. The dielectric layer 220 and the additional dielectric layer 130 may be made of transparent resin that can transmit light, for example, polyurethane acrylate (PUA) or polydimethylsiloxane (PDMS).

Differently therefrom, the additional dielectric layer 130 may be made of different material from the dielectric layer 220. At this time, the additional dielectric layer 130 may be a light transmission layer and the dielectric layer may be a light reflective layer. For example, the dielectric layer 220 may include light reflective material dispersed inside the resin. The light reflective material may be Ag powder by way of example. Thereby, the light leaked downward can be prevented.

Moreover, the first electrode 110 and the second electrode 120 may be bonded to each other by an adhesive member interposed between the dielectric layer 220 and the second electrode 140 or between the dielectric layer 220 and the additional dielectric layer 130.

Therefore, the electronic paper display device according to the present invention can prevent the direct contact between the electronic balls and the electrodes, making it possible to prevent the charges charged to the electronic balls from being leaked.

Further, the light reflective material is included in the dielectric layer, making it possible to more effectively prevent the light leaked downward.

Hereinafter, an electronic paper display device according to a third embodiment of the present invention will be described with reference to FIG. 3. Herein, the third embodiment of the present invention may have the same constitution as the aforementioned second embodiment, excepting for the shape of the dielectric shape. Therefore, the explanation of the third embodiment overlapped with the second embodiment will be omitted and the same reference numerals will be given to the same constituents.

FIG. 3 is a cross-sectional view of an electronic paper display device according to a third embodiment of the present invention.

Referring to FIG. 3, the electronic paper display device according to the third embodiment of the present invention may include a first electrode 110, a first dielectric layer 320 that is disposed on the first electrode 110, a second dielectric layer 330 that faces the first dielectric layer 320, a second electrode 140 that is disposed on the second dielectric layer 330, and electronic balls 150 that are interposed between the first dielectric layer 320 and the second dielectric layer 330 to display an image according to the electric fields applied to the first electrode 110 and the second electrode 140.

The first dielectric layer 320 may further include first recessed parts 322 formed by a first barrier 321 in an inwardly recessed round shape. A plurality of first recessed parts 322 may be disposed at a predetermined interval. Therefore, the top surface of the first barrier 321 may have a flat surface. At this time, the first electrode 110 corresponding to the areas where the first recessed parts 322 are formed may be covered by the first dielectric layer 320. For example, the first recessed part 322 may have a hemisphere shape. Therefore, the direct contact between the electronic balls 150 and the first electrode 110 can be prevented by the first dielectric layer 320, making it possible to prevent the charges charged to the electronic balls 150 from being leaked to the first electrode 110.

The second dielectric layer 330 may include second recessed parts 332 corresponding to the first recessed parts 322. In other words, the second dielectric layer 330 may include a second barrier 331 in a round shape corresponding to the first barrier 321. Also, the second electrode 140 corresponding to the areas where the second recessed parts 332 are formed may be covered by the second dielectric layer 330. For example, the second recessed parts 332 may have a hemisphere shape. Therefore, the direct contact between the electronic balls 150 and the second electrode 140 can be prevented, making it possible to prevent the charges charged to the electronic balls 150 from being leaked to the second electrode 140.

Herein, when the first and second electrodes 110 and 140 are bonded to each other so that the first and second dielectric layers 320 and 330 face each other, the first recessed part 322 and the second recessed part 332 face each other, wherein the first and second recessed parts 322 and 332 may form the cell 323 for disposing the electronic ball 150. Herein, the cell 323 is formed by the first and second recessed parts 322 and 332 having hemisphere shapes that are symmetrical to each other up and down, such that the cell 323 may have a circular cross-sectional shape. Therefore, when the electronic ball 150 is a twist ball that is rotated to display an image, the cell 323 has a circular shape to enable to reduce the friction force between the electronic ball 150 and the cell 323, making it possible to lower the driving voltage for rotating the electronic ball 150.

The first dielectric layer 320 and the second dielectric layer 330 may be made of the same material. At this time, the first dielectric layer 320 and the second dielectric layer 330 may be a light transmission layer that can transmit light.

Differently therefrom, the first dielectric layer 320 and the second dielectric layer 330 may be made of different materials. For example, the first dielectric layer 320 may be formed of a light reflective layer that reflects light and the second dielectric layer 330 may be formed of a light transmission layer that can transmit light. Herein, the first dielectric layer 320 may include light reflective material such as Ag powder mixed with resin, but the material of the first dielectric layer 320 is not limited thereto in the embodiment of the present invention. Therefore, the light leaked downward can be reflected upward by the first dielectric layer 320, making it possible to improve light efficiency.

Herein, the electronic balls 150 may be twist balls or microcapsules by way of example. At this time, when the electronic balls 150 are twist balls, the insides of the respective cells 323 may be filled with dielectric liquid and the electronic balls 150 may be floated on the inside of the dielectric liquid.

Therefore, the cells of the electronic paper display device according to the embodiment of the present invention are formed in a circular cross-sectional shape so that the electronic balls can be more easily rotated, making it possible to more lower the driving voltage of the electronic paper display device.

Hereinafter, an electronic paper display device according to a fourth embodiment of the present invention will be described with reference to FIG. 4. Herein, the fourth embodiment of the present invention may have the same constitution as the aforementioned third embodiment, excepting for the shape of the dielectric shape. Therefore, the explanation of the fourth embodiment overlapped with the third embodiment will be omitted and the same reference numerals will be given to the same constituents.

FIG. 4 is a plan view of an electronic paper display device according to a fourth embodiment of the present invention.

FIG. 5 is a cross-sectional view of the electronic paper display device according to the fourth embodiment of the present invention.

Referring to FIGS. 4 and 5, the electronic paper display device according to the fourth embodiment of the present invention may include a first electrode 110, a first dielectric layer 420 that is disposed on the first electrode 110 and has first recessed parts 422, a second dielectric layer 430 that faces the first dielectric layer 420 and has second recessed parts 432 defining cells 423 together with the first recessed parts 422, a second electrode 140 that is disposed on the second dielectric layer 430, and electronic balls 150 that are interposed between the first dielectric layer 420 and the second dielectric layer 430 to display an image according to the electric fields applied to the first electrode 110 and the second electrode 140.

The first dielectric layer 420 may have first recessed parts 422 defined by a first barrier 421 recessed in a round shape. Herein, the first recessed parts 422 are continuously disposed so that the top surface of the first dielectric layer 420 may have an embossed shape. At this time, the first barrier 421 that is disposed around the first recessed parts 422, that is, between the first recessed parts 422 neighboring each other, may have an apex.

Meanwhile, the second dielectric layer 430 may have second recessed parts 432 defined by a second barrier 431 in a round shape. At this time, the second recessed parts 432 may have a shape corresponding to the first recessed part 422. Thereby, the second recessed parts 432 may be continuously disposed as the first recessed parts 422, such that the top surface of the second dielectric layer 430 may have an embossed shape.

Herein, when the first electrode and second electrode 140 are bonded to each other so that the first dielectric layer 420 and the second dielectric layer 430 face each other, the first recessed parts and the second recessed parts 432 may define cells 423 that are symmetrical to each other up and down to have circular cross-sections. At this time, the density of the cells 423 can be improved by the first and second recessed parts 422 and 432 disposed in an embossed shape.

Therefore, when the respective cells 423 are filled with the electronic balls 150, not only the fill factor of the electronic balls 150 can be enhanced but also the electronic balls 150 can be uniformly disposed. In other words, the intervals between the neighboring cells 423 are reduced so that a non-display area where an image is not displayed can be reduced, making it possible to improve the contrast ratio and to more improve the image quality characteristics.

In addition, the periphery of the first recessed part 422 and the periphery of the second recessed part 432 may contact each other. In other words, the first barrier 421 and the second barrier 431 may contact each other. Thereby, the electronic balls can be stably fixed inside the cells.

Further, when the electronic balls 150 are twist balls that are rotated to display an image, the cells 423 have a circular shape to enable to reduce the friction force between the electronic balls 150 and the first and second barriers 421 and 431, making it possible to lower the driving voltage for rotating the electronic balls 150.

Moreover, the first electrode and the second electrode 140 can be bonded to each other, while sealing the electronic balls 150, by an adhesive member interposed between the first dielectric layer 420 and the second dielectric layer 430. At this time, the adhesive member 450, which is resin having adhesion, may be made of UV curable resin by way of example.

Therefore, the electronic paper display device according to the embodiment of the present invention reduces the spaced intervals between the cells, making it possible to improve the contrast ratio and the image quality characteristics.

Further, the cells are formed in a circular cross-sectional shape so that the electronic balls can be more easily rotated, making it possible to more lower the driving voltage of the electronic paper display device.

Hereinafter, an electronic paper display device according to a fifth embodiment of the present invention will be described with reference to FIG. 6. Herein, the fifth embodiment of the present invention may have the same constitution as the aforementioned fourth embodiment, excepting for the shape of the dielectric shape. Therefore, the explanation of the fifth embodiment overlapped with the fourth embodiment will be omitted and the same reference numerals will be given to the same constituents.

FIG. 6 is a cross-sectional view of an electronic paper display device according to a fifth embodiment of the present invention.

Referring to FIG. 6, the electronic paper display device according to the fifth embodiment of the present invention may include a first electrode 110, a first dielectric layer 520 that is disposed on the first electrode 520 and has first recessed parts 522, a second dielectric layer 530 that faces the first dielectric layer 520 and has second recessed parts 532 defining cells 523 together with the first recessed parts 522, a second electrode 140 that is disposed on the second dielectric layer 530, and electronic balls 150 that are interposed between the first dielectric layer 520 and the second dielectric layer 530 to display an image according to the electric fields applied to the first electrode 110 and the second electrode 140.

Herein, the first recessed parts 522 and the second recessed parts 532 are continuously disposed, respectively, so that the top surfaces of the first and second dielectric layers 520 and 530 may have an embossed shape, respectively. Thereby, the cells 523 defined by the first recessed parts 522 and the second recessed parts 532 are continuously disposed, making it possible to enhance the fill factor of the electronic balls.

Further, the first and second recessed parts 522 and 532 may be formed by the first and second barriers 521 and 531 each formed on the first and second dielectric layers 520 and 530.

At this time, the edge of the first dielectric layer 520 may have a higher height than that of the first barrier 521. Also, the edge of the second dielectric layer 530 may have a higher height than that of the second barrier 531. Thereby, when the first dielectric layer 520 faces the second dielectric layer 530, the first and second barriers 521 and 531 may be spaced from each other at a predetermined interval although the first and the second dielectric layers 520 and 530 contact each other. In other words, the peripheral part of the first recessed part 522 and the peripheral part of the second recessed part 532 may be spaced from each other. Thereby, the plurality of cells 523 may be easily filled with dielectric liquid through the peripheral parts of the first recessed parts 522 and the peripheral parts of the second recessed parts 532, that is, the spaced spaces around the cells 523.

Therefore, the electronic paper display device according to the embodiment of the present invention reduces the spaced intervals between the cells, making it possible to improve the contrast ratio and the image quality characteristics.

Further, the cells are formed in a circular cross-sectional shape so that the electronic balls can be more easily rotated, making it possible to more lower the driving voltage of the electronic paper display device.

Moreover, the plurality of cells can be easily filled with the dielectric liquid through the spaced spaces formed around the cells.

Hereinafter, an electronic paper display device according to a sixth embodiment of the present invention will be described with reference to FIG. 7. Herein, the sixth embodiment of the present invention may have the same constitution as the aforementioned fifth embodiment, excepting for the adhesive member. Therefore, the explanation of the sixth embodiment overlapped with the fifth embodiment will be omitted and the same reference numerals will be given to the same constituents.

FIG. 7 is a cross-sectional view of an electronic paper display device according to a sixth embodiment of the present invention.

Referring to FIG. 7, the electronic paper display device according to the sixth embodiment of the present invention may include a first electrode 110, a first dielectric layer 520 that is disposed on the first electrode 110 and has first recessed parts 522, a second dielectric layer 530 that faces the first dielectric layer 520 and has second recessed parts 532 defining cells 523 together with the first recessed parts 522, a second electrode 140 that is disposed on the second dielectric layer 530, and electronic balls 150 that are interposed between the first dielectric layer 520 and the second dielectric layer 530 to display an image according to the electric fields applied to the first electrode 110 and the second electrode 140.

Herein, the first and second electrodes 110 and 140 may be bonded to each other due to the adhesive force between the first dielectric layer 520 and the second dielectric layer 530.

Therefore, the electronic paper display device according to the embodiment of the present invention can not only reduce the thickness thereof but also simplify the process and require no separate adhesive member, making it possible to lower the manufacturing costs.

Hereinafter, a manufacturing method of an electronic paper display device according to a seventh embodiment of the present invention will be described with reference to FIGS. 8 to 11. The seventh embodiment of the present invention limits the manufacturing method of the electronic paper display device according to the sixth embodiment that has been aforementioned. However, the electronic paper display devices according to the first to fifth embodiments can be sufficiently manufactured by those skilled in the art to which the present invention pertains through the seventh embodiment, such that the manufacturing methods of the electronic paper display devices according to the first to fifth embodiments will be omitted.

FIGS. 8 to 11 are cross-sectional views explaining a manufacturing method of an electronic paper display device according to a seventh embodiment of the present invention.

Referring to FIG. 8, in order to manufacture the electronic paper display device, a first auxiliary dielectric layer 520a is first formed on a first electrode 110.

Herein, the first electrode 110 may be formed of a conductive substrate. Herein, the first electrode 110 may be formed of a metal substrate such as Cu and Ag by way of example. In the embodiment of the present invention, although the first electrode 110 may function as a supporting layer simultaneously with functioning as an electrode, it is not limited thereto but a base layer that is a separate supporting layer may further be disposed on the lower part of the first electrode 110.

The first auxiliary dielectric layer 520a may be formed of a light transmission layer that can transmit light. At this time, the first auxiliary dielectric layer 520a may be made of thermosetting resin or UV curable resin by way of example. For example, the first auxiliary dielectric layer 520a may be made of polyurethane acrylate (PUA) or polydimethylsiloxane (PDMS). Also, the first auxiliary dielectric layer 520a may be formed of a light reflective layer that reflects light. Herein, the first auxiliary dielectric layer 520a may include light reflective material such as Ag powder mixed with resin.

After semi-curing the first auxiliary dielectric layer 520a, as shown in FIG. 9, the surface of the first auxiliary dielectric layer 520a is etched by emitting laser on the first auxiliary dielectric layer 520a, thereby forming a first dielectric layer 520 having a first barrier 521 that is inwardly recessed to have a round shape. At this time, the first dielectric layer 520 may define first recessed parts 522 by the first barrier 521 in a round shape.

Herein, the first electrode 110 corresponding to the areas where the first recessed parts 522 are formed may be covered by the first dielectric layer 520. However, it is not limited thereto in the embodiment of the present invention but the first electrode 110 corresponding to the areas where the first recessed parts 522 are formed may be exposed from the first dielectric layer 520.

Further, the first recessed parts 522 are continuously disposed in order to enhance the fill factor of electronic balls 150 to be described later so that the top surface of the first dielectric layer 520 may be formed in an embossed shape. However, it is not limited thereto, but the first recessed parts 522 neighboring each other may be formed to be spaced from each other at a predetermined interval.

Moreover, the height of the first dielectric layer 521 may be formed to be smaller than the thickness of the edge of the first dielectric layer 520. However, it is not limited thereto in the embodiment of the present invention, but the height of the first barrier 521 may be formed to be the same as the thickness of the edge of the first dielectric layer 520.

Referring to FIG. 10, respective electronic balls 150 are separately injected into the plurality of first recessed parts 522. Herein, the electronic balls 150 may be twist balls or microcapsules. Herein, after disposing a filter having opening portions corresponding to the first recessed parts 522 on the first dielectric layer 520, vibration is applied to the filter or to the first electrode 110 including the first dielectric layer 520, such that the electronic balls 150 can be selectively injected into the first recessed parts 522.

Referring to FIG. 11, a second electrode 140 that has a second dielectric layer 530 including second recessed parts 532 corresponding to the first recessed parts 522 is provided.

The second electrode 140 may be formed of a transparent conductive substrate. The second electrode 140 may be made of ITO, IZO, ITZO, etc. by way of example. Alternately, the second electrode 140 may be formed of a transparent conductive film. At this time, a base layer may further be disposed on the second electrode 140 in order to support the second electrode 140.

In the same manner as the process of forming the first dielectric layer 520, after forming a semi-cured second auxiliary dielectric layer on the second electrode 140, laser is emitted onto the second auxiliary dielectric layer to form a second barrier in a round shape, thereby making it possible to form a second dielectric layer 530 having second recessed parts 532. Herein, the second auxiliary dielectric layer may be formed of a light transmission layer that can transmit light, in the same manner as the first dielectric layer.

Further, the second electrode 140 corresponding to the areas where the second recessed parts 532 are formed may be covered by the second dielectric layer 530. However, it is not limited thereto in the embodiment of the present invention, but the second electrode 140 corresponding to the areas where the second recessed parts 532 are formed may be exposed from the second dielectric layer 530.

Moreover, the second recessed parts 532 are continuously disposed in order to enhance the fill factor of electronic balls 150 to be described later so that the top surface of the second dielectric layer 530 may be formed in an embossed shape. However, it is not limited thereto, but the second recessed parts 532 neighboring each other may be formed to be spaced from each other at a predetermined interval.

In addition, the height of the second barrier may be formed to be smaller than the thickness of the edge of the second dielectric layer 530. However, it is not limited thereto in the embodiment of the present invention, but the height of the second barrier may also be formed to be the same as the thickness of the edge of the second dielectric layer 530.

Thereafter, the first and second electrodes 110 and 140 are aligned so that the first and second dielectric layers 520 and 530 face each other, for sealing the electronic balls 140 and then the first and second dielectric layers 520 and 530 in a semi-cured state are completely cured, such that the first and second electrodes 110 and 140 can be bonded to each other.

At this time, when the height of the first barrier 521 is smaller than the thickness of the edge of the first dielectric layer 520 and the height of the second barrier 531 is smaller than the thickness of the edge of the second dielectric layer 530, the first barrier 521 may be spaced from the second barrier 531. In other words, the peripheral part of the first recessed part 522 may be spaced from the peripheral part of the second recessed part 532. However, it is not limited thereto in the embodiment of the present invention, but, for example, when the height of the first barrier 521 is the same as the thickness of the edge of the first dielectric layer 520 and the height of the second barrier 531 is the same as the thickness of the edge of the second dielectric layer 530, the first barrier 521 and the second barrier 531 may contact each other. In other words, the peripheral part of the first recessed part 522 and the peripheral part of the second recessed part 532 may contact each other.

Therefore, the first and second dielectric layers 520 and 530 having the first and second recessed parts 522 and 532 may be easily formed using laser, making it possible to simplify the process of the electronic paper display device.

Further, after aligning the semi-cured first and second dielectric layers 520 and 530, the first and second electrodes 110 and 140 are bonded to each other by completely curing the first and second dielectric layers 520 and 530 so that the process can be more easily performed, and a separate adhesive member is not required so that it can reduce the manufacturing costs. Furthermore, the thickness of the electronic paper display device can be reduced.

However, the forming method of the first and second dielectric layers is not limited in the embodiment of the present invention, but the first and second recessed parts may be formed through an imprint method using stamps. Also, in order to bond the first electrode to the second electrode, the first and second dielectric layers are first completely cured, respectively, and then the adhesive member is coated on the first dielectric layer or the second dielectric layer. Thereafter, after aligning the first and second electrodes so that the first dielectric layer faces the second dielectric layer, the adhesive member is cured, thereby making it possible to bond the first and second electrodes each other.

In addition, when the electronic balls 150 are twist balls, a process of injecting dielectric liquid into the inside of the areas of the respective cells 523 defined by the first and second recessed parts 522 and 532 around the electronic balls 150 may further be added. The first and second electrodes 110 and 140 bonded in order to inject the dielectric liquid are dipped in the dielectric liquid. At this time, the dielectric liquid may be injected into the inside of the areas of the respective cells through the porous provided in the first and second dielectric layers 520 and 530. Herein, as the dielectric liquid, liquid-phase material capable of performing liquid-phase light conversion and having volatile component, for example, liquid-phase material such as Dow corning 10, Centistoke 220, etc. may be used.

Therefore, as shown in the embodiment of the present invention, the electronic paper display device may be manufactured using easy processes such as laser or the imprint method.

In particular, when the recessed part is formed using laser, the bonding process of the first and second electrodes is formed through the curing process of the semi-cured dielectric layers so that a separate adhesive member is not required, making it possible to reduce the number of processes.

The electronic paper display device according to the present invention has the cells for disposing the electronic balls to enable to uniformly arrange the electronic balls, making it possible to improve the contrast ratio and to prevent the image quality defects from being generated.

Further, since the respective cells of the electronic paper display device according to the present invention are defined by the barrier in a round shape, the resistance value for rotating the twist balls can be reduced, in particular, when the electronic balls are twist balls, making it possible to lower the driving voltage of the electronic paper display device.

Moreover, the respective cells of the electronic paper display device according to the present invention are formed in an embossed shape where they are continuously disposed to enable to enhance the fill factor of the electronic balls and to reduce the area of the non-display area, making it possible to more improve the contrast ratio and the image quality.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electronic paper display device, comprising:
   a first electrode;
   a dielectric layer that is disposed on the first electrode and has a plurality of cells defined by a barrier;
   a second electrode that faces the dielectric layer; and
   electronic balls that are disposed inside respective cells to display an image according to the electric fields applied to the first and second electrodes,
   wherein a side of the barrier is formed in a recessed round shape.

2. The electronic paper display device according to claim 1, further comprising:
   an additional dielectric layer that faces the dielectric layer and is disposed on the second electrode.

3. The electronic paper display device according to claim 2, further comprising:

an adhesive member that is interposed between the dielectric layer and the additional dielectric layer.

4. The electronic paper display device according to claim 1, wherein the electronic balls are twist balls or microcapsules.

5. The electronic paper display device according to claim 1, wherein the first electrode in areas corresponding to the cells is exposed.

6. The electronic paper display device according to claim 1, wherein the first electrode in areas corresponding to the cells is covered by the dielectric layer.

7. An electronic paper display device, comprising:
a first electrode;
a first dielectric layer that is disposed on the first electrode and has a plurality of first recessed parts, each first recessed part configured in a recessed round shape;
a second dielectric layer that is disposed on the first dielectric layer and has a plurality of second recessed parts, each second recessed part configured in a recessed round shape;
a second electrode that is disposed on the second dielectric layer; and
electronic balls that are disposed inside respective cells defined by the first recessed parts together with the second recessed parts and display an image according to electric fields applied to the first and second electrodes.

8. The electronic paper display device according to claim 7, wherein peripheral parts of the first recessed parts and peripheral parts of the second recessed parts contact each other.

9. The electronic paper display device according to claim 7, wherein peripheral parts of the first recessed parts and a peripheral part of the second recessed parts are spaced from each other.

10. The electronic paper display device according to claim 7, further comprising:
an adhesive member that is interposed between the first dielectric layer and the second dielectric layer.

11. The electronic paper display device according to claim 7, wherein the first recessed parts and the second recessed parts are continuously disposed respectively on top and bottom surfaces of the first and second dielectric layers in an embossed shape.

12. The electronic paper display device according to claim 7, wherein the first and second dielectric layers are made of the same material.

13. The electronic paper display device according to claim 7, wherein the first and second dielectric layers are made of different materials.

14. The electronic paper display device according to claim 7, wherein the first dielectric layer is a light reflective layer that can reflect light and the second dielectric layer is a light transmission layer that can transmit light.

15. The electronic paper display device according to claim 7, wherein the first and second dielectric layers each corresponding to the first and second recessed parts expose the first and second electrodes.

16. The electronic paper display device according to claim 7, wherein the first and second dielectric layers each corresponding to the first and second recessed parts cover the first and second electrodes.

17. The electronic paper display device according to claim 7, wherein the electronic balls are twist balls and the electronic balls are floated on dielectric liquid filled in areas of respective cells.

18. The electronic paper display device according to claim 7, wherein the electronic balls are microcapsules.

19. A manufacturing method of an electronic paper display device, comprising:
forming a first dielectric layer having first recessed parts, each first recessed part configured in a recessed round shape on a first electrode and a second dielectric layer having second recessed parts, each second recessed part configured in a recessed round shape on a second electrode;
disposing electronic balls inside respective first recessed parts with a ball in each recessed part; and
disposing the second dielectric layer and the second electrode on the first dielectric layer and the electronic balls so that each electronic ball is between the each first recessed part and the each second recessed part.

20. The manufacturing method of the electronic paper display device according to claim 19, wherein the first recessed parts and the second recessed parts are formed through an imprint method or a laser processing.

21. The manufacturing method of the electronic paper display device according to claim 19, wherein the first dielectric layer and the second dielectric layer are semi-cured when forming the first dielectric layer and the second dielectric layer is carried out.

22. The manufacturing method of the electronic paper display device according to claim 21, wherein the first dielectric layer and the second dielectric layer are completely cured after disposing the second dielectric layer and the second electrode on the first dielectric layer and the electronic balls.

23. The manufacturing method of the electronic paper display device according to claim 19, wherein the first dielectric layer and the second dielectric layer are completely cured when forming the first dielectric layer and the second dielectric layer is carried out.

24. The manufacturing method of the electronic paper display device according to claim 23, wherein the first dielectric layer and second dielectric layer are bonded to each other by an adhesive member interposed therebetween after the disposing the second dielectric layer and the second electrode on the first dielectric layer and the electronic balls.

25. The manufacturing method of the electronic paper display device according to claim 19, further comprising, after disposing the second dielectric layer and the second electrode on the first dielectric layer and the electronic balls,
injecting dielectric liquid into the inside of the respective cells defined by the first recessed parts and the second recessed parts around the electronic balls.

26. The manufacturing method of the electronic paper display device according to claim 19, wherein the first recessed parts and second recessed parts are continuously formed respectively on the top and bottom surfaces of the first dielectric layer and second dielectric layer in embossed shape.

* * * * *